United States Patent
Bi et al.

(10) Patent No.: US 11,264,659 B2
(45) Date of Patent: Mar. 1, 2022

(54) RECHARGEABLE LITHIUM-HYDROXIDE BASED NON-AQUEOUS LITHIUM OXYGEN BATTERIES

(71) Applicant: UChicago Argonne, LLC, Chicago, IL (US)

(72) Inventors: Xuanxuan Bi, Naperville, IL (US); Jun Lu, Naperville, IL (US); Khalil Amine, Oakbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 163 days.

(21) Appl. No.: 16/545,127

(22) Filed: Aug. 20, 2019

(65) Prior Publication Data

US 2021/0057795 A1  Feb. 25, 2021

(51) Int. Cl.
*H01M 12/06* (2006.01)
*H01M 4/48* (2010.01)
(Continued)

(52) U.S. Cl.
CPC ......... *H01M 12/065* (2013.01); *H01M 4/483* (2013.01); *H01M 4/622* (2013.01); *H01M 4/661* (2013.01); *H01M 10/0562* (2013.01); *H01M 50/411* (2021.01); *H01M 4/134* (2013.01); *H01M 4/136* (2013.01); *H01M 4/382* (2013.01); *H01M 4/386* (2013.01); *H01M 4/587* (2013.01); *H01M 4/625* (2013.01); *H01M 10/052* (2013.01); *H01M 10/0568* (2013.01); *H01M 10/0569* (2013.01); *H01M 12/08* (2013.01); *H01M 50/417* (2021.01);
(Continued)

(58) Field of Classification Search
CPC .......... H01M 10/0562; H01M 12/065; H01M 2004/027; H01M 2004/028; H01M 4/483; H01M 4/622; H01M 4/661; H01M 50/411; H01M 10/052; H01M 10/0568; H01M 10/0569; H01M 12/08; H01M 4/134; H01M 4/136; H01M 4/382; H01M 4/386; H01M 4/587; H01M 4/625; H01M 50/417; H01M 50/431; H01M 50/497; Y02E 60/10
See application file for complete search history.

(56) References Cited

U.S. PATENT DOCUMENTS

| 9,343,787 B2 | 5/2016 | Takechi et al. |
| 2011/0033733 A1* | 2/2011 | Ouchi ............... H01M 10/0413 429/49 |

(Continued)

OTHER PUBLICATIONS

Johnson et al., "The role of $LiO_2$ solubility in $O_2$ reduction in aprotic solvents and its consequences for Li—$O_2$ batteries," Nat Chem 2014, 6 (12), 1091-1099.

(Continued)

*Primary Examiner* — Lingwen R Zeng
(74) *Attorney, Agent, or Firm* — Foley & Lardner LLP

(57) ABSTRACT

An electrochemical device includes an air cathode; a lithium-containing anode metal; a porous separator; and a non-aqueous electrolyte comprising a lithium salt, a sodium salt, and a solvent; wherein the electrochemical device is a lithium-air battery. A total concentration of the lithium salt and the sodium salt in the non-aqueous electrolyte may be from about 0.001 M to about 7 M.

15 Claims, 6 Drawing Sheets

(51) Int. Cl.
*H01M 2/16* (2006.01)
*H01M 4/66* (2006.01)
*H01M 4/62* (2006.01)
*H01M 10/0562* (2010.01)
*H01M 50/411* (2021.01)
*H01M 4/02* (2006.01)
*H01M 50/497* (2021.01)
*H01M 50/431* (2021.01)
*H01M 10/052* (2010.01)
*H01M 10/0568* (2010.01)
*H01M 4/38* (2006.01)
*H01M 4/134* (2010.01)
*H01M 4/587* (2010.01)
*H01M 50/417* (2021.01)
*H01M 12/08* (2006.01)
*H01M 10/0569* (2010.01)
*H01M 4/136* (2010.01)

(52) U.S. Cl.
CPC ........ *H01M 50/431* (2021.01); *H01M 50/497* (2021.01); *H01M 2004/027* (2013.01); *H01M 2004/028* (2013.01); *Y02E 60/10* (2013.01)

(56) References Cited

U.S. PATENT DOCUMENTS

2012/0276459 A1* 11/2012 Im .................... H01M 10/0566
 429/405
2016/0285107 A1* 9/2016 Lu ....................... H01M 4/382
2016/0301078 A1* 10/2016 Zhamu ............... H01M 50/431
2017/0207500 A1 7/2017 Amine et al.

OTHER PUBLICATIONS

Xia et al., "The critical role of phase-transfer catalysis in aprotic sodium oxygen batteries," Nat Chem 2015, 7 (6), 496-501.

* cited by examiner

RECHARGEABLE LITHIUM-HYDROXIDE BASED NON-AQUEOUS LITHIUM OXYGEN BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to high-energy efficient lithium hydroxide based lithium-oxygen batteries enabled by the additives in the electrolyte without requiring the presence of heavy transition metals.

BACKGROUND

Rechargeable lithium air (oxygen) batteries are a promising alternative to lithium ion (Li-ion) batteries and they have attracted extensive research interests due to their ultrahigh theoretical energy density of 3500 Wh kg$^{-1}$, a five to seven fold increase over the state-of-the-art Li-ion batteries.[1-3] In a typical lithium oxygen cell, oxygen is reduced at the cathode (air electrode) where it reacts with Li$^+$ to initially form LiO$_2$. The LiO$_2$ then undergoes a disproportionation reaction to produce the final discharge product, Li$_2$O$_2$. Upon charging, the Li$_2$O$_2$ is oxidized and removed from the electrode surface.

In addition to the formation of Li$_2$O$_2$, LiOH is generally observed as a side product in lithium oxygen batteries. The LiOH is an insulating material, so the charge of LiOH requires much higher energy, leading to a low energy efficiency. Nevertheless, Liu et al. found that when a redox mediator containing I$^-$/I$_3^-$, reduced graphene oxide, and a precious metal catalyst, were used, the LiOH was the sole discharge product and it can be recharged at a low charge potential.[4] However, the method is complex and the precious metal catalyst has a high cost.

SUMMARY

In one aspect, provided herein is an electrochemical device comprising: an air cathode; a lithium-containing anode; a discharge product that is LiOH; a porous separator; and a non-aqueous electrolyte comprising a lithium salt, a sodium salt, and a solvent; wherein the electrochemical device is a lithium-air battery that has been discharged at least one time. The electrochemical device, prior to a first discharging cycle is free of LiOH, NaOH, Li$_2$O$_2$, and Na$_2$O$_2$.

In another aspect, a process of discharging a lithium air battery is provided, the process comprising discharging a lithium air battery to form a discharged lithium air battery comprising an air cathode comprising lithium hydroxide, wherein the lithium air battery comprises a non-aqueous electrolyte comprising a lithium salt, a sodium salt, and a solvent. The air cathode, prior the discharging is free of LiOH, NaOH, Li$_2$O$_2$, and Na$_2$O$_2$. The process may then include applying a potential to the discharged lithium air battery to generate lithium, oxygen, and water from the lithium hydroxide.

DETAILED DESCRIPTION

Figure 1:
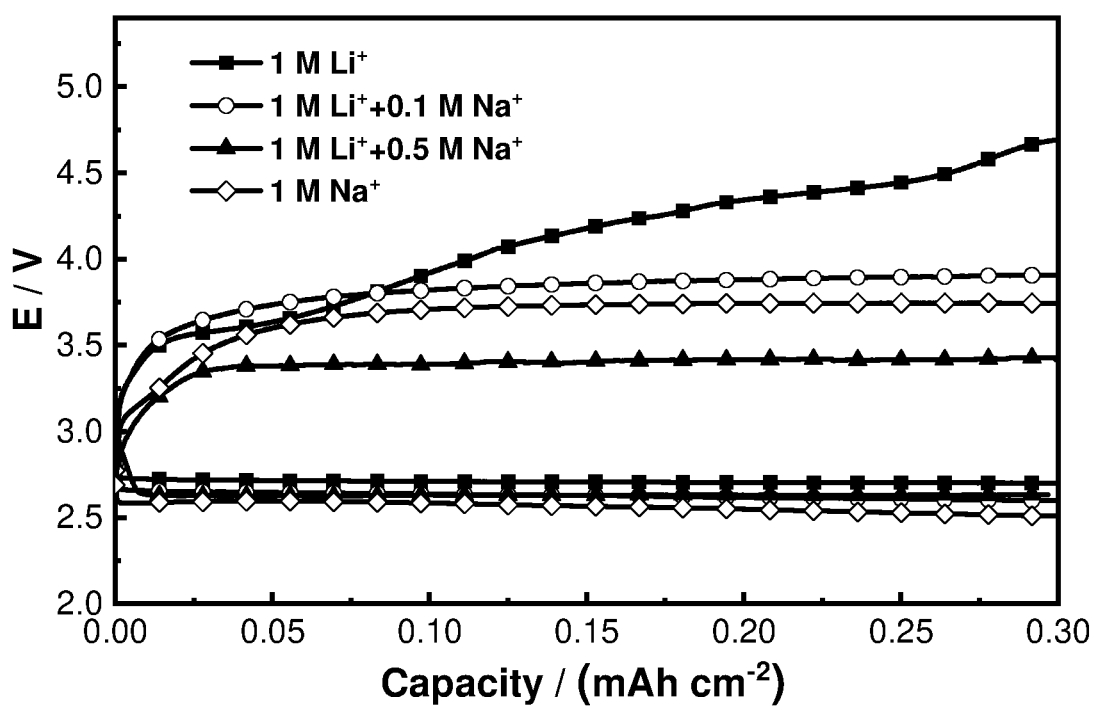
FIG. 1 is a composite graph of the voltage profiles of lithium air batteries with 1 M Li$^+$ electrolyte, 1 M Li$^+$ and 0.1 M Na$^+$ electrolyte, 1 M Li$^+$ and 0.5 M Na$^+$ electrolyte, and 1 M Na$^+$ electrolyte, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Provided herein are rechargeable non-aqueous lithium ion based electrochemical cells that are able to cycle in an air atmosphere, or in an oxygen atmosphere, while providing acceptable stability and cycle life. The electrochemical cells include electrolytes that have sodium ions included therein. The addition of sodium ions enhances the electrochemical performance of the cell, and causes a remarkable decrease in charge overpotential from over 4 V to 3.3 V. The discharge product shifts from the typical Li$_2$O$_2$ to LiOH, which can be reversibly charged during cycling. Without being bound by theory, it is believed that the incorporation of sodium ions in the electrolyte of a lithium air battery enables the reversible reduction and oxidation of the LiOH, and it enables the application of LiOH-based lithium oxygen batteries. Furthermore, the cell does not contain any precious metal catalysts or complex air electrodes.

In a typical lithium air battery, inclusion of active materials in the air cathode upon construction of the cell may be needed. For example, air cathodes may be pre-lithiated with materials such as $Li_2O$, $Li_2O_2$, $Na_2O$, or $Na_2O_2$, where upon charging lithium or sodium is formed along with oxygen. However, it has now been found that no such active materials are required with the sodium ion inclusion in the electrolyte of the instantly disclosed cells where LiOH is formed during discharge.

In one aspect, an electrochemical device that is a lithium air battery is provided. The lithium air battery includes an air cathode containing a discharge product that is LiOH, a lithium-containing anode, a separator, and an electrolyte containing lithium ions, sodium ions, and a solvent. To contain the LiOH the lithium air battery has been discharged at least one time.

In the lithium air battery, the concentration of the lithium ions and sodium ions (from the respective salts) in the electrolyte is from about 0.001 mol/L ("molar," or "M") to about 7 mol/L. In some embodiments, the concentration of the lithium ions and sodium ions (from the respective salts) in the electrolyte is from about 0.1 M to about 4 M. The anions of the lithium and sodium salts (counterion to the lithium and sodium ions) in the electrolyte may be the same or different. The electrolyte may include both conducting salts, which, upon discharge of the battery, favor formation of lithium hydroxide with both low discharge/charge overpotentials. As defined herein, a low discharge overpotential is 0.6 V or less.

Illustrative sodium salts for use in the lithium air batteries include, but are not limited to, $Na[CF_3CO_2]$; $Na[C_2F_5CO_2]$; $NaClO_4$; $NaBF_4$; $NaAsF_6$; $NaPF_6$; $Na[PF_2(C_2O_4)_2]$; $Na[PF_4(C_2O_4)]$; $Na[CH_3SO_3]$; $Na[N(SO_2F)_2]$; $Na[N(SO_2CF_3)_2]$; $Na[C(CF_3SO_2)_3]$; $Na[N(SO_2C_2F_5)_2]$; a sodium alkyl fluorophosphate; a sodium alkyl fluoroborate; sodium 4,5-dicyano-2-(trifluoromethyl)imidazole; sodium 4,5-dicyano-2-methylimidazole; trisodium 2,2',2"-tris(trifluoromethyl)benzotris(imidazolate); $Na[B(C_2O_4)_2]$; $Na[BF_2(C_2O_4)_2]$; $Na_2[(B_{12}X_{12-n}H_n)]$; $Na_2[(B_{10}X_{10-n'}H_{n'})]$; or a mixture of any two or more thereof, wherein X is independently at each occurrence a halogen, n, is an integer from 0 to 12 and n' is an integer from 0 to 10. In some embodiments, the sodium salt includes $NaSO_3CF_3$, $NaN(SO_2CF_3)_2$, $NaN(SO_2F)_2$, $NaPF_6$, $NaBF_4$, $NaClO_4$, $NaAsF_6$, $NaSiF_6$, $NaSbF_6$, $NaAlCl_4$, $NaNO_3$, $Na_2SO_4$, NaOH, or a mixture of any two or more thereof.

Illustrative lithium salts for use in the lithium air batteries include, but are not limited to, lithium alkyl fluorophosphates; lithium alkyl fluoroborates; lithium 4,5-dicyano-2-(trifluoromethyl)imidazole; lithium 4,5-dicyano-2-methylimidazole; trilithium 2,2',2"-tris(trifluoromethyl)benzotris(imidazolate); $LiN(CN)_2$; $Li(CF_3CO_2)$; $Li(C_2F_5CO_2)$; $LiCF_3SO_3$; $LiCH_3SO_3$; $LiN(SO_2CF_3)_2$; $LiN(SO_2F)_2$; $LiC(CF_3SO_2)_3$; $LiN(SO_2C_2F_5)_2$; $LiClO_4$; $LiBF_4$; $LiAsF_6$; $LiPF_6$; $LiBF_2(C_2O_4)$, $LiB(C_2O_4)_2$, $LiPF_2(C_2O_4)_2$, $LiPF_4(C_2O_4)$, $LiAsF_6$, CsF, $CsPF_6$, $LiN(SO_2CF_3)_2$, $LiN(SO_2F)_2$, $Li_2$, $(B_{12}X_{12-p}H_p)$; $Li_2(B_{10}X_{10-p'}H_{p'})$; or a mixture of any two or more thereof, wherein X may be independently at each occurrence a halogen, p may be 0, 1, 2, 3, 4, 5, 6, 7, 8, 9, 10, 11, or 12, and p' may be 0, 1, 2, 3, 4, 5, 6, 7, 8, 9, or 10. In some embodiments, the lithium salt includes $LiSO_3CF_3$, $LiN(SO_2CF_3)_2$, $LiN(SO_2F)_2$, $LiPF_6$, $LiBF_4$, $LiClO_4$, $LiAsF_6$, $LiSiF_6$, $LiSbF_6$, $LiAlCl_4$, $LiNO_3$, $Li_2SO_4$, LiOH, or a mixture of any two or more thereof. In any of the above embodiments, the lithium salt may be $LiSO_3CF_3$ and the sodium salt may be $NaSO_3CF_3$.

In any of the embodiments herein, the solvent may include, but is not limited to, ethers such as, dimethoxyethane (DME), diethylene glycol dimethyl ether (DEGDME), triethylene glycol dimethyl ether, tetraethylene glycol dimethyl ether (TEGDME), ethylene carbonate (EC), dimethylcarbonate (DMC), diethylcarbonate (DEC), propylene carbonate (PC), dioloxane, γ-butyrolactone, δ-butyrolactone, N-alkylpyrrolidone, a fluororinated ether, fluorinated esters, fluoroethylene carbonate, adiponitrile, (ethylene glycol)-methyltrimethyl silane (1NM1), di(ethylene glycol)-methyltrimethyl silane (1NM2), tri(ethylene glycol)-methyltrimethyl silane (1NM3), acetonitrile (ACN), dimethyl sulfoxide (DMSO), dimethylformamide (DMF), siloxanes, triethyl phosphate, N,N-dimethylacetamide, N-methylpyrrolidone, methoxybenzene, an ionic liquid, or a mixture of any two or more thereof. In some embodiments, the solvent is an ether solvent. According to various embodiments, when the ether solvent is DME, DEGDME, triethylene glycol dimethyl ether, TEGDME, or a mixture of any two or more thereof. In some embodiments, the solvent comprises includes $Na_3PS_4$ inorganic solid electrolyte, β-Alumina electrolyte, NASICON based solid electrolyte of $NaMP_3O_{12}$, gel electrolytes such as polyethylene oxide (PEO), polyacrylonitride (PAN), polymethylmethacrylate (PMMA), and combinations thereof; wherein M is a divalent cation, a trivalent cation, a tetravalent cation, or a pentavalent cation. In some embodiments, the divalent cation is $Cd^{2+}$, $Mn^{2+}$, $Co^{2+}$, $Ni^{2+}$, or $Zn^{2+}$; the trivalent cation is $Al^{3+}$, $Ga^{3+}$, or $Y^{3+}$; the tetravalent cation is $Ti^{4+}$, $Si^{4+}$, or $Zr^{4+}$; and the pentavalent cation is $V^{5+}$, $Nb^{5+}$, or $Sb^{5+}$.

In various embodiments, the porous separator includes a glass fiber material, a carbon fiber material, polyethylene, polypropylene, poly/propylene/polyethylene/polypropylene, solid state membranes, or a combination of any two or more thereof.

As noted above, the anode is a lithium-containing anode. The lithium may be present in the anode as lithium metal, lithiated carbon, lithiated silicon, LiM alloy (where M stands for Na, Al, Bi, Cd, Mg, Sn, and Sb), lithium titanium oxide, or a combination of any two or more thereof.

In any of the above embodiments, the air cathode, prior to a first discharge charge cycle, is free of LiOH, NaOH, $Li_2O_2$, and/or $Na_2O_2$. The air cathode, after a first discharge, comprises LiOH.

In another aspect, provided herein is a discharged cathode containing lithium hydroxide and a carbon substrate. The amount of LiOH is from about 80 wt. % to about 100 wt. % of the total amount of the discharge product. Other discharge products may include $Li_2O_2$, $NaO_2$, NaOH or $Na_2O_2 \cdot 2H_2O$ but the LiOH is the dominant discharge product. In the present batteries, the LiOH is an active product that can reversibly charge.

In one embodiment, the cathode includes carbon substrate that is a porous carbon material or porous metal substrate, which is free of catalysts. In one embodiment, the porous carbon material may include microporous carbon, mesoporous carbon, mesoporous microbeads, graphite, expandable graphite, carbon black, or carbon nanotubes. In another embodiment, air or oxygen gas serves as the cathodic reagent. In another embodiment, provided herein are anodes including a lithium metal or a combination of lithium metal and sodium metal. The anode may be lithium metal or a lithium-containing material such as a lithium metal oxide, pre-lithiated graphite, or a lithium metal alloys. In some embodiments, the anode may be a lithium/sodium alloy, or a lithium/sodium metal oxide. As used herein, "free of catalysts" is intended to mean free of materials that are typically used as catalysts to facilitate the oxygen reduction reaction in air cathode cells. Such catalysts can include Pt, Pd, Au, Ru, Ir, Ag, PtNi, PtAu, PtCu, PtRu, PtPd, $MnO_2$, NiO, $Co_3O_4$, redox mediators, or combinations of any two or more thereof.

In various embodiments, the air cathode also includes a current collector, a binder, or any combination thereof.

The current collector for the air cathode may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy. Current collectors for the cathode may be made of a wire mesh such that oxygen/air ingress to the device is not inhibited. In any of the above embodiments, the cathode current collector may include, but it not limited to, copper, stainless steel, or titanium.

When used, the binder may be present in the cathodes in an amount of from about 0.1 wt % to about 99 wt %. In some embodiments, the binder is present in the cathode in an amount from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers. In some embodiments, the binder includes polyaniline, polypyrrole, poly(pyrrole-co-aniline), polyphenylene, polythiophene, polyacetylene, polysiloxane, polyvinylidene difluoride (PVDF), polyfluorene, polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), alginate, gelatine, a copolymer of any two or more such polymers, or a blend of any two or more such polymers. The binder should not inhibit ingress of oxygen through the cathode into the device.

In addition to the lithium as noted above, the anode may include a current collector, a conductive carbon material, a binder, or any combination thereof.

The current collector for the anode may be prepared from a wide variety of materials. Illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy. In any of the above embodiments, the anode current collector may include, but it not limited to, copper, stainless steel, or titanium.

Illustrative conductive carbon materials for use in the anode include, but are not limited to, synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, and any mixture of two or more thereof. In some embodiments, the conductive carbon materials include, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, and Ketjen Black®. In some embodiments, the conductive carbon material includes synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, or any mixture of two or more thereof.

When used, the binder may be present in the anodes in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers. In some embodiments, the binder includes polyaniline, polypyrrole, poly(pyrrole-co-aniline), polyphenylene, polythiophene, polyacetylene, polysiloxane, polyvinylidene difluoride (PVDF), polyfluorene, polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), alginate, gelatine, a copolymer of any two or more such polymers, or a blend of any two or more such polymers.

In another aspect, a process of discharging a lithium air battery is provided. The process includes providing any of the lithium air batteries as noted above, and which include a lithium-containing anode, a separator, an air cathode, and an electrolyte containing lithium ions, sodium ions, and a solvent, followed by discharging the lithium air battery such that LiOH forms in the cathode. The reverse process may then be conducted by applying a charging potential to the discharged lithium air battery such that the LiOH forms lithium metal, oxygen, and water. Thus, the lithium hydroxide that is formed upon discharge of the lithium air battery is reversibly formed under normal charging potentials.

REFERENCES

1. Lu, J.; Li, L.; Park, J. B.; Sun, Y. K.; Wu, F.; Amine, K., Aprotic and aqueous Li-O(2) batteries. *Chem Rev* 2014, 114 (11), 5611-40.
2. Lu, Y.-C.; Gallant, B. M.; Kwabi, D. G.; Harding, J. R.; Mitchell, R. R.; Whittingham, M. S.; Shao-Horn, Y., Lithium-oxygen batteries: bridging mechanistic understanding and battery performance. *Energy & Environmental Science* 2013, 6 (3), 750.
3. Wang, Z. L.; Xu, D.; Xu, J. J.; Zhang, X. B., Oxygen electrocatalysts in metal-air batteries: from aqueous to nonaqueous electrolytes. *Chem Soc Rev* 2014, 43 (22), 7746-86.
4. Liu, T.; Leskes, M.; Yu, W.; Moore, A. J.; Zhou, L.; Bayley, P. M.; Kim, G.; Grey, C. P., Cycling Li-O2 batteries via LiOH formation and decomposition. *Science* 2015, 350, 530-533.

The present invention, thus generally described, will be understood more readily by reference to the following examples, which are provided by way of illustration and are not intended to be limiting of the present invention.

EXAMPLES

Example 1. Lithium oxygen cells were assembled using lithium foil (99.9%, MTI Corporation) as the anode, glass microfiber filters (420 um, Whatman™ GF/F) as the separator and H23I6 carbon fiber paper (Freudenberg FCCT) as the air electrode in a stainless steel cell setup with a half inch diameter size. The stainless steel includes a gas inlet and an outlet at the top of the cell. The electrolyte included 1 M lithium trifluoromethanesulfonate ($LiSO_3CF_3$, "LiOTf," 99.995%, Sigma-Aldrich) in triethylene glycol dimethyl ether (TEGDME, ReagentPlus®, 99%, Sigma-Aldrich) with varying concentrations of sodium trifluoromethanesulfonate ($NaSO_3CF_3$, "NaOTf," 98%, Sigma-Aldrich). The varying concentrations were: Cell 1: 0 NaOTf; Cell 2: 0.1 M NaOTf; and Cell 3: 0.5 M NaOTf. The TEGDME solvent was dried with 3 Å molecular sieves (Sigma-Aldrich) and the salts were dried in a vacuum oven at 100° C. overnight before use to remove adventitious water. The water content in the electrolytes that were tested was about 50 ppm by using a Mettler Toledo C20 Karl Fischer Coulometer. A stainless steel grid window was employed as the current collector in the air electrode and two O-rings were used to seal the stainless steel setup. The testing cell was assembled in an argon filled glove box (oxygen <0.1 ppm, water <0.5 ppm) and then equilibrated in a 1 atm oxygen atmosphere for 30 min. A voltage window of 2.2-4.8 V (vs. $Li^+/Li$) and a current of 0.05 $mA \cdot cm^{-2}$ were applied to the cells (FIG. 1).

Figure 2:
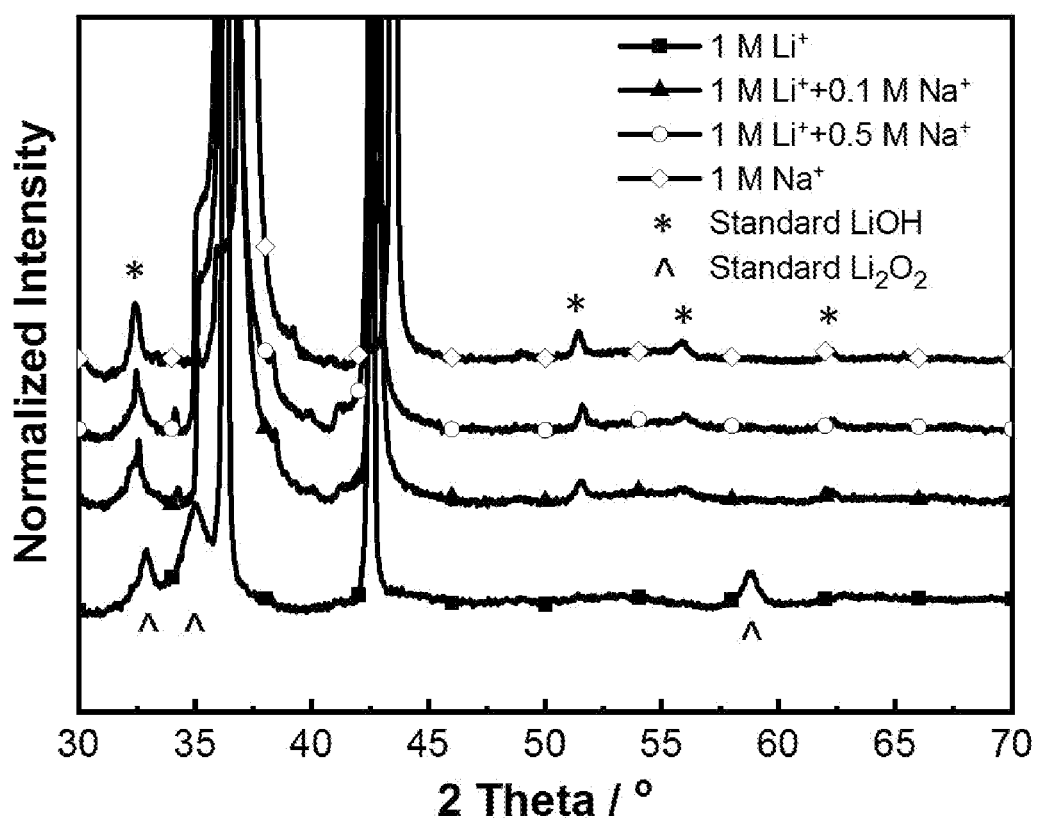
FIG. 2 is a composite graph the x-ray diffraction patters for discharged electrodes in FIG. 1, along with reference standards of LiOH and Li$_2$O$_2$, according to the examples. The asterisks show the standard diffraction position of Li$_2$O$_2$ and the carets are the standard diffraction position of LiOH.
Figure 3:
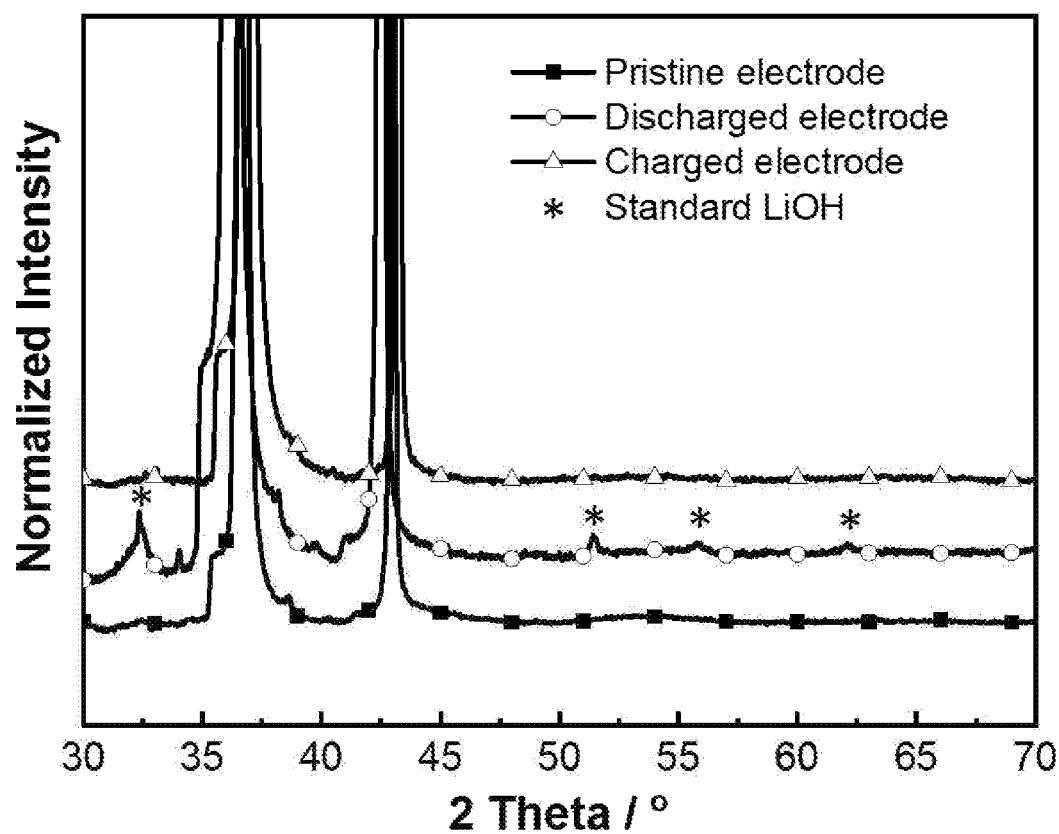
FIG. 3 is a composite graph of x-ray diffraction patterns for the pristine electrode, discharged electrodes, and charged electrode in the electrolyte with 1 M Li$^+$ and 0.5 M Na$^+$. The asterisks show the standard diffraction position of LiOH.

X-ray diffractions were performed to identify the discharge product(s) on the discharged electrode. FIG. 2 shows the x-ray diffraction patterns of the discharged electrodes in 1 M LiOTf with 0 M NaOTf, 0.1 M NaOTf, and 0.5 M NaOTf, along with the standard signals of $Li_2O_2$ and LiOH. The discharged electrode in 1 M LiOTf matches the signals of $Li_2O_2$. The discharged electrode in 1 M LiOTf with 0.1 M NaOTf and the discharged electrode in 1 M LiOTf with 0.5 M NaOTf matches the signals of LiOH. The peaks located at 37° and 43° are the standards signals from the nickel sample holder. FIG. 3 shows the x-ray diffraction patterns for the pristine electrode, discharged electrodes, and charged electrode in the electrolyte with 1 M $Li^+$ and 0.5 M $Na^+$. The asterisks show the standard diffraction position of LiOH. The pristine electrode shows only the sample holder signals at 37° and 43°. The discharged electrode shows the signals of LiOH and the charged electrode shows the signals of LiOH disappear. The result demonstrates that after charge the discharge product, LiOH, is removed from the cathode, confirming the reversibility of LiOH.

Figure 4:
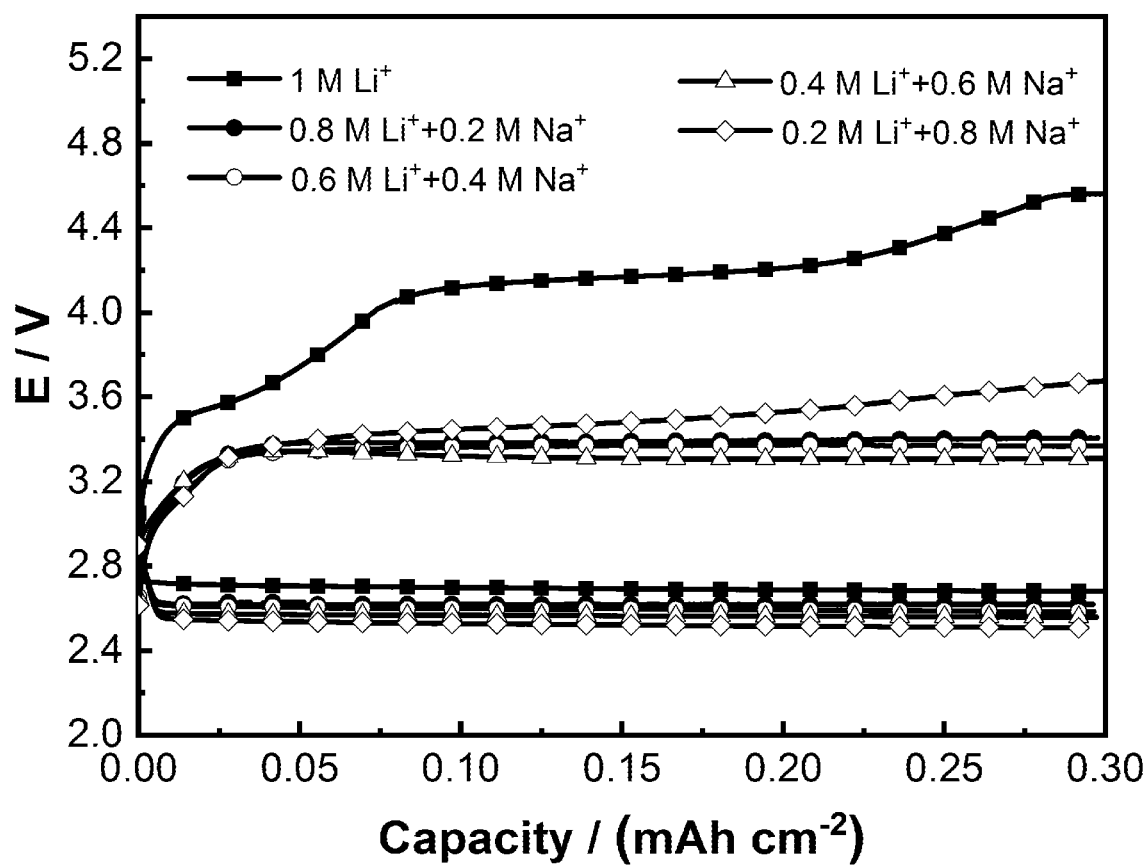
FIG. 4 is a composite graph of the voltage profiles of lithium air batteries with 1 M Li$^+$ electrolyte, 0.8 M Li$^+$ and 0.2 M Na$^+$ electrolyte, 0.6 M Li$^+$ and 0.4 M Na$^+$ electrolyte, 0.4 M Li$^+$ and 0.6 M Na$^+$ electrolyte, and 0.2 M Li$^+$ and 0.8 M Na$^+$ electrolyte, according to the examples.

Example 2. A lithium air battery was assembled and tested in the similar manner to Example 1, with the exception that the electrolytes included the total concentration of 1 M conducting salts of LiOTf and/or NaOTf in TEGDME. The concentrations of the conducting salts were: Cell 4: 1 M LiOTf, 0 M NaOTf; Cell 5: 0.8 M LiOTf, 0.2 M NaOTf; Cell 6: 0.6 M LiOTf, 0.4 M NaOTf; Cell 7: 0.4 M LiOTf, 0.6 M NaOTf; and Cell 8: 0.2 M LiOTf, 0.8 M NaOTf. FIG. 4 are the voltage profiles of the cells in the five electrolytes. In 1 M LiOTf electrolyte, the charge voltage is mostly over 4 V, leading to a low energy efficiency; while in other electrolytes with NaOTf, the charge voltages are only 3.4 V, leading to a high energy efficiency.

Figure 5:
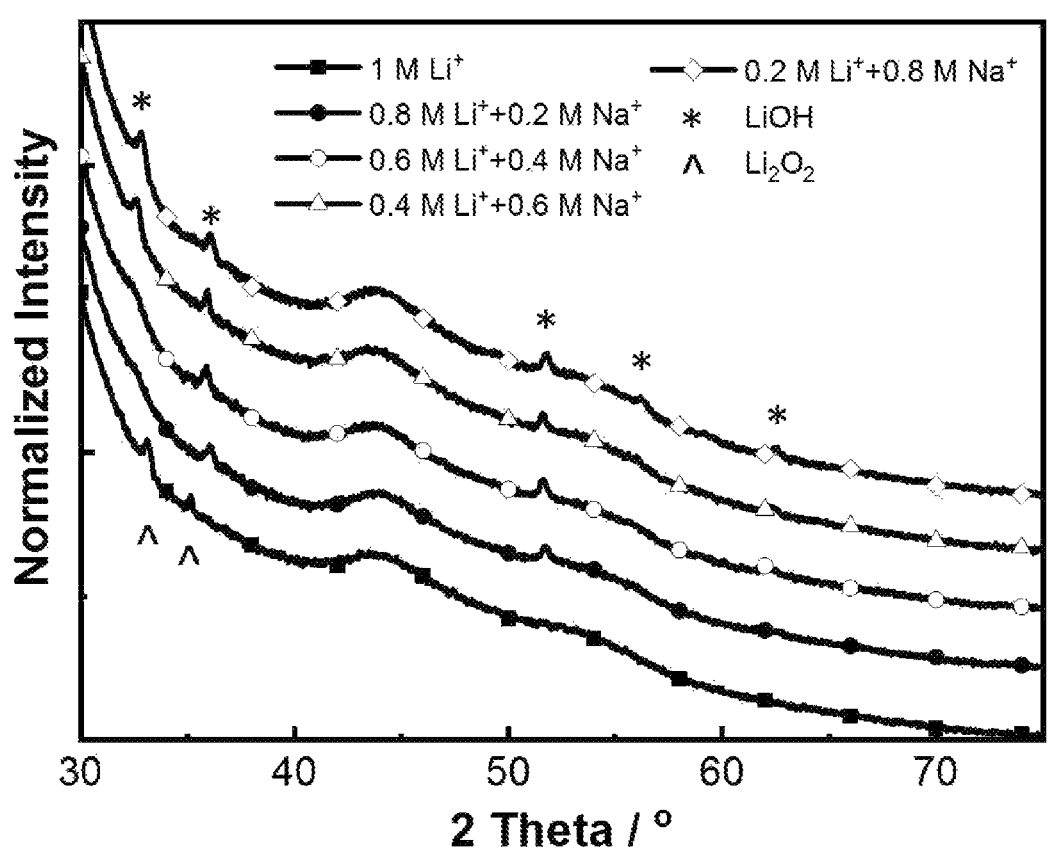
FIG. 5 is a composite graph of x-ray diffraction patterns for the five discharged electrodes from FIG. 4, according to the examples.
Figure 6:
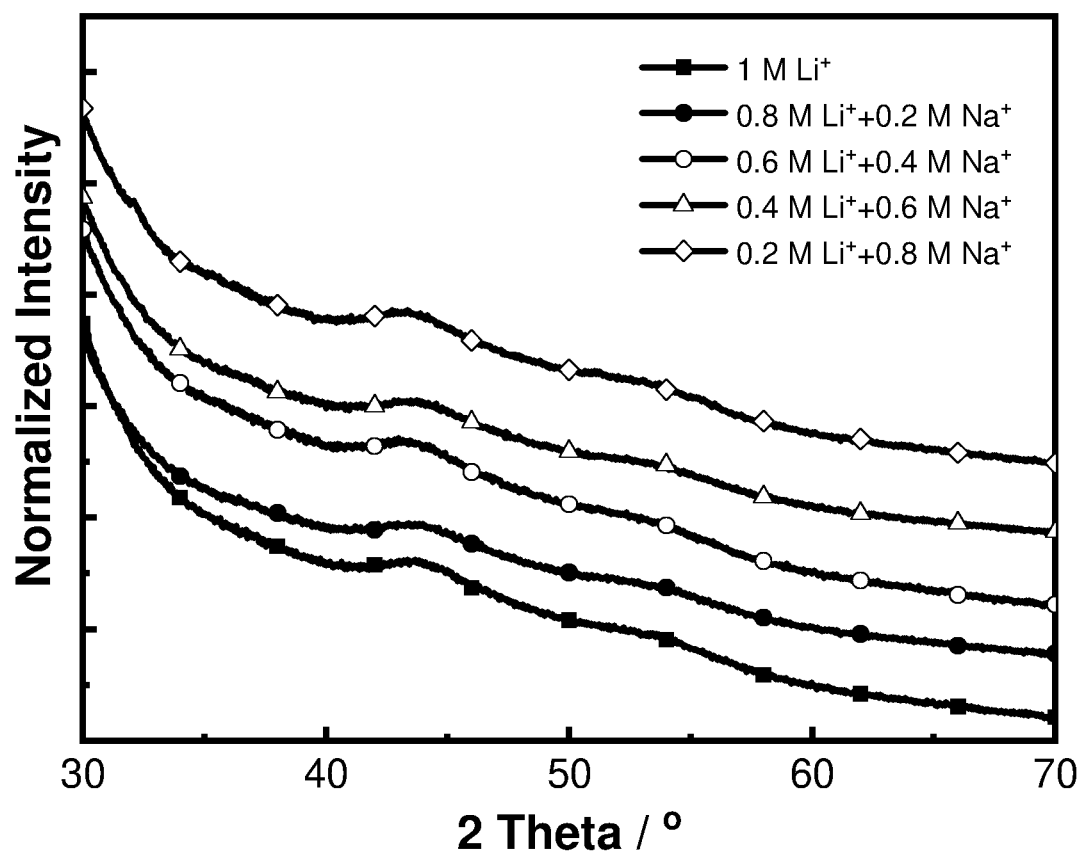
FIG. 6 is a composite graph of x-ray diffraction patterns for the five charged electrodes from FIG. 4, according to the examples.

X-ray diffractions were performed to identify the discharge product(s) on the discharged electrode (FIG. 5) and the charged electrodes (FIG. 6). FIG. 5 shows the x-ray diffractions of the discharged electrodes in the five electrolytes and the standard signals of $Li_2O_2$ and LiOH. The discharged electrode in 1 M LiOTf matches the signals of $Li_2O_2$. The discharged electrodes in NaOTf containing electrolytes matches the signals of LiOH. FIG. 6 shows the charged electrodes in the five electrolytes and the standard signals of $Li_2O_2$ and LiOH. After charging, the signals of the discharge product disappear, verifying the removal of the discharge products in the lithium air battery.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:
1. An electrochemical device comprising:
   an air cathode;
   a lithium-containing anode;
   a discharge product comprising from 80 wt % to 100 wt % LiOH;
   a porous separator; and
   a non-aqueous electrolyte comprising a lithium salt, a sodium salt, and a solvent;
   wherein:
   the electrochemical device is a lithium-air battery that has been discharged at least one time;
   the lithium salt comprises lithium alkyl fluorophosphates; lithium alkyl fluoroborates; lithium 4,5-dicyano-2-(trifluoromethyl)imidazole; lithium 4,5-dicyano-2-methylimidazole; trilithium 2,2',2"-tris(trifluoromethyl)benzotris(imidazolate); $LiN(CN)_2$; $Li(CF_3CO_2)$; $Li(C_2F_5CO_2)$; $LiCF_3SO_3$; $LiCH_3SO_3$; $LiN(SO_2CF_3)_2$; $LiN(SO_2F)_2$; $LiC(CF_3SO_2)_3$; $LiN(SO_2C_2F_5)_2$; $LiClO_4$; $LiBF_4$; $LiAsF_6$; $LiPF_6$; $LiBF_2(C_2O_4)$, $LiB(C_2O_4)_2$, $LiPF_2(C_2O_4)_2$, $LiPF_4(C_2O_4)$, $LiAsF_6$, $CsF$, $CsPF_6$, $LiN(SO_2CF_3)_2$, $LiN(SO_2F)_2$, $Li_2(B_{12}X_{12-p}H_p)$; $Li_2(B_{10}X_{10-p'}H_{p'})$; or a mixture of any two or more thereof, wherein X may be independently at each occurrence a halogen, p may be 0, 1, 2, 3, 4, 5, 6, 7, 8, 9, 10, 11, or 12, and p' may be 0, 1, 2, 3, 4, 5, 6, 7, 8, 9, or 10; and
   the sodium salt comprises $Na[CF_3CO_2]$; $Na[C_2F_5CO_2]$; $NaClO_4$; $NaBF_4$; $NaAsF_6$; $NaPF_6$; $Na[PF_2(C_2O_4)_2]$; $Na[PF_4(C_2O_4)]$; $Na[CH_3SO_3]$; $Na[N(SO_2F)_2]$; $Na[N(SO_2CF_3)_2]$; $Na[C(CF_3SO_2)_3]$; $Na[N(SO_2C_2F_5)_2]$; a sodium alkyl fluorophosphate; a sodium alkyl fluoroborate; sodium 4,5-dicyano-2-(trifluoromethyl)imidazole; sodium 4,5-dicyano-2-methylimidazole; trisodium 2,2',2"-tris(trifluoromethyl)benzotris(imidazolate); $Na[B(C_2O_4)_2]$; $Na[BF_2(C_2O_4)_2]$; $Na_2[(B_{12}X_{12-n}H_n)]$; $Na_2[(B_{10}X_{10-n'}H_{n'}]$; or a mixture of any two or more thereof, wherein X is independently at each occurrence a halogen, n, is an integer from 0 to 12 and n' is an integer from 0 to 10.

2. The electrochemical device of claim 1, wherein the porous separator comprises a glass fiber material, a carbon fiber material, polyethylene, polypropylene, poly/propylene/polyethylene/polypropylene, solid state membranes, or a combination of any two or more thereof.

3. The electrochemical device of claim 1, wherein the anode further comprises a current collector, a conductive carbon material, a binder, or any combination thereof.

4. The electrochemical device of claim 3 comprising the current collector, wherein the current collector comprises copper, stainless steel, or titanium.

5. The electrochemical device of claim 3 comprising the conductive carbon material, wherein the conductive carbon material comprises synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, and any mixture of two or more thereof.

6. The electrochemical device of claim 3 comprising the binder, wherein the binder comprises polyaniline, polypyrrole, poly(pyrrole-co-aniline), polyphenylene, polythiophene, polyacetylene, polysiloxane, polyvinylidene difluoride (PVDF), polyfluorene, polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), alginate, gelatine, a copolymer of any two or more such polymers, or a blend of any two or more such polymers.

7. The electrochemical device of claim 1, wherein the sodium salt comprises $NaSO_3CF_3$, $NaN(SO_2CF_3)_2$, $NaN(SO_2F)_2$, $NaPF_6$, $NaBF_4$, $NaClO_4$, $NaAsF_6$, $NaSiF_6$, $NaSbF_6$, $NaAlCl_4$, $NaNO_3$, $Na_2SO_4$, $NaOH$, or a mixture of any two or more thereof.

8. The electrochemical device of claim 1, wherein the lithium salt comprises $LiSO_3CF_3$, $LiN(SO_2CF_3)_2$, $LiN(SO_2F)_2$, $LiPF_6$, $LiBF_4$, $LiClO_4$, $LiAsF_6$, $LiSiF_6$, $LiSbF_6$, $LiAlCl_4$, $LiNO_3$, $Li_2SO_4$, LiOH, or a mixture of any two or more thereof.

9. The electrochemical device of claim 1, wherein the lithium salt is $LiSO_3CF_3$ and the sodium salt is $NaSO_3CF_3$.

10. The electrochemical device of claim 1, wherein a total concentration of the lithium salt and the sodium salt is from about 0.001 M to about 7 M.

11. The electrochemical device of claim 1, wherein the solvent comprises dimethoxyethane (DME), diethylene glycol dimethyl ether (DEGDME), triethylene glycol dimethyl ether, tetraethylene glycol dimethyl ether (TEGDME), ethylene carbonate (EC), dimethylcarbonate (DMC), diethylcarbonate (DEC), propylene carbonate (PC), dioloxane, γ-butyrolactone, δ-butyrolactone, N-alkylpyrrolidone, fluorinated ethers, fluorinated esters, fluoroethylene carbonate, adiponitrile, (ethylene glycol)methyltrimethyl silane (1NM1), di(ethylene glycol)methyltrimethyl silane (1NM2), tri(ethylene glycol)methyltrimethyl silane (1NM3), acetonitrile (ACN), dimethyl sulfoxide (DMSO), dimethylformamide (DMF), siloxanes, triethyl phosphate, N,N-dimethylacetamide, N-methylpyrrolidone, methoxybenzene, an ionic liquid, or a mixture of any two or more thereof.

12. The electrochemical device of claim 11, wherein the ether solvent comprises DME, DEGDME, triethylene glycol dimethyl ether, TEGDME, or a mixture of any two or more thereof.

13. The electrochemical device of claim 1, wherein the solvent comprises $Na_3PS_4$ inorganic solid electrolyte, β-Alumina electrolyte, $NaMP_3O_{12}$, gelled polyethylene oxide (PEO), gelled polyacrylonitride (PAN), gelled polymethylmethacrylate (PMMA), or a mixture of any two or more thereof; wherein M is a divalent cation, a trivalent cation, a tetravalent cation, or a pentavalent cation.

14. The electrochemical device of claim 1, wherein the lithium-containing anode comprises one or more of lithium metal, lithiated carbon, lithiated silicon, LiM alloy (where M stands for Na, Al, Bi, Cd, Mg, Sn, and Sb), lithium titanium oxide, or a combination of any two or more thereof.

15. The electrochemical device of claim 1, wherein the anode comprises lithium metal.

\* \* \* \* \*